(No Model.)
I. S. SCHROP.
METER RECORD.
No. 434,207. Patented Aug. 12, 1890.
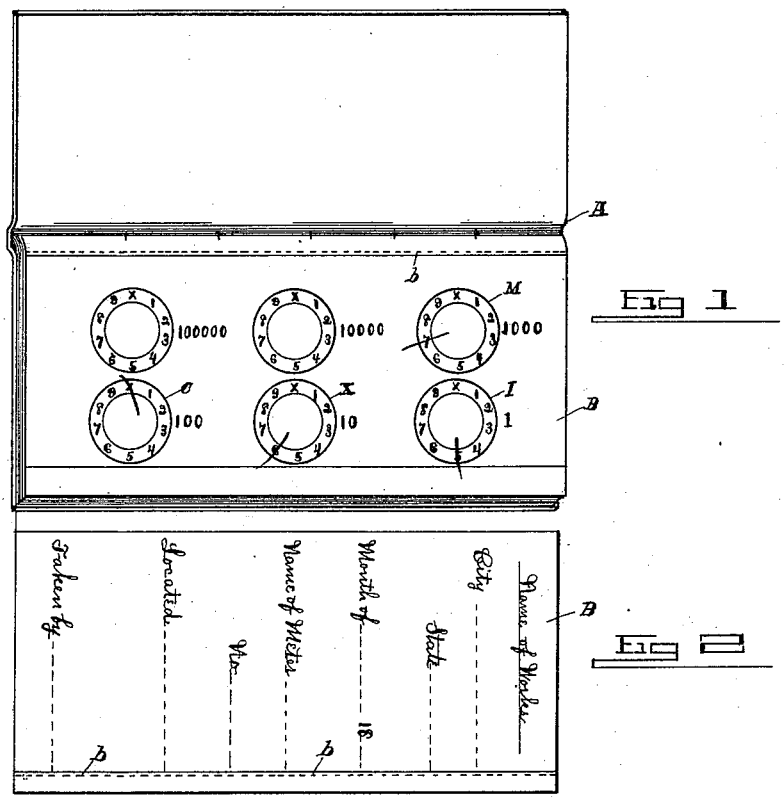
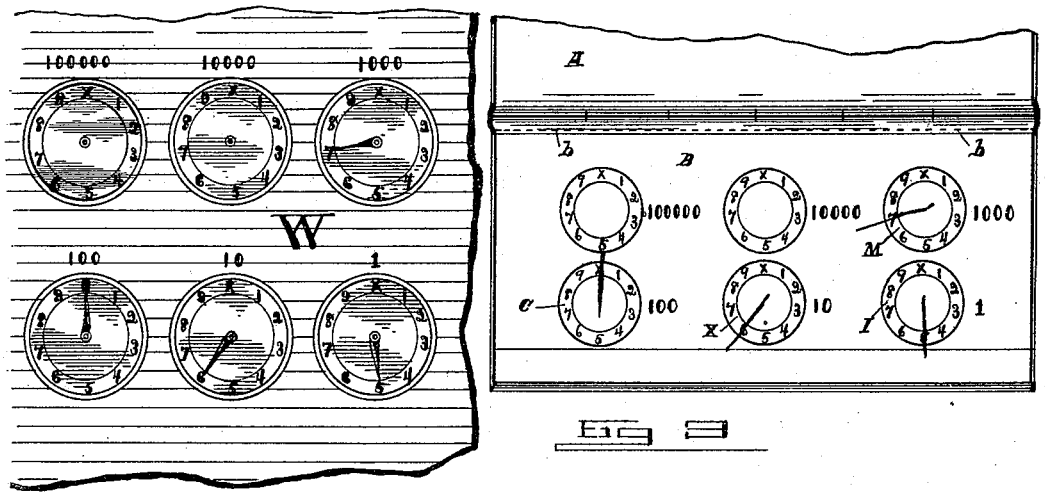
Fig. 4.
Witnesses
Inventor
I. S. Schrop
By his Attorney

UNITED STATES PATENT OFFICE.

IRA S. SCHROP, OF SOUTH BEND, INDIANA.

METER-RECORD.

SPECIFICATION forming part of Letters Patent No. 434,207, dated August 12, 1890.

Application filed February 6, 1890. Serial No. 339,403. (No model.)

*To all whom it may concern:*

Be it known that I, IRA S. SCHROP, of South Bend, in the county of St. Joseph and State of Indiana, have invented certain new and useful Improvements in Meter-Records; and I do hereby declare that the following is a full, clear, and exact description thereof, reference being had to the accompanying drawings, and to the letters of reference marked thereon, which form part of this specification, in which—

Figure 1 is a perspective view of a book of my improved meter-dial records opened. Fig. 2 is a view of the reverse side of one of the sheets. Figs. 3 and 4 are views illustrating the manner of taking a reading or record.

This invention is designed for use in connection with liquid, gas, and other meters, wherein the volume of matter measured by the meter actuates a registering mechanism that imparts movement to a series of pointers or indicating-dials, each dial representing so many units of different denominations, so that by noting the positions of the pointers in respect to the several dials, which are properly numbered, the amount or volume of matter passed through or measured by the meter can be readily calculated.

The invention has for its object to provide a record, preferably in book form, on the pages of which are printed fac-similes of the registering-indicating apparatus or dials of the meter, without the pointers thereof, and on the reverse side of each page are proper blanks on which can be noted the date on which the reading or record of the meter was taken, the number and location of meter, &c., so that by keeping the records and comparing same the volume of matter measured by the meter between different recordings can be readily calculated at the main office, and the records themselves can be taken by any employé without requiring any particular skill or experience.

The invention consists, essentially, in a printed record-blank, having fac-similes and blanks, as above mentioned, and which will be clearly understood from the following description and claims.

Referring to the drawings by letter, A designates the record-book of ordinary appearance and make.

B B designate the leaves of the book, and these may be perforated near their inner sides, as at *b*, to permit the leaves to be readily torn from the book. On the face of each leaf is a printed representation of several dials I X C M, &c., respectively, representing one unit, ten units, a hundred, a thousand, &c., and each dial being peripherally divided into ten or more equal spaces, which are properly numbered, as shown. The printed dials are arranged to represent exactly the indicating-dials of the meter of which the records are to be taken. At one side of the dials may be printed the name of the record, and at the opposite side the kind of meter from which records are taken, with statement. On the reverse side of each leaf are printed the name of the works or company owning the meters or works, and blanks for the date, number of meter, location, and name of employé taking the record, as shown.

In using the record the positions of the pointers of the meter W in relation to its dials are noted, and then by pen or pencil a mark is made on the corresponding printed dial of the record, as indicated in Fig. 3, thus saying that on the meter the pointer on the units-dial indicates 5—*i. e.*, five-tenths or one-half of a unit— on the tens-dial is at 6, on the hundreds-dial at 0, and on the thousands-dial at 7, &c. The employé having the record-blank in his hand would draw a mark through Fig. 5 on dial I, through Fig. 6 on dial X, through Fig. 7 on dial M, and the record would be complete without the employé having to calculate the amount recorded or express it in figures. At the office the position of the pointers being thus exactly shown, it could be readily ascertained that the volume indicated by the meter was 706.5 (seven hundred and six and one-half) units of whatever kind of measure the meter might be calculated to register. The employé, on the reverse side of the sheet, should fill in the blanks indicating the position of the meter, &c. The records could be detached and filed or kept in the book, so that at the next recording of the meter the second record could be compared with the first, and the quantity passed through the meter in the intermediate time readily ascertained.

Having thus described my invention I claim—

1. A record-blank for recording the positions of the pointers in relation to the dials of liquid and gas meters, &c., consisting of a leaf having a printed representation of the indicating-dials of the meter on one side, omitting the pointers or indicators, the positions of which on the meter-dials are indicated by marking on the record, substantially as described.

2. A record for recording the positions of the pointers in relation to the dials of meters having registering dials and pointers, such records consisting of a leaf having a printed representation of the dials or indexes of the meter in arrangement and appearance, whereby the record can be taken by marking on the record-dial representations the positions of the pointers of the meter in relation to the dials thereof, substantially as set forth.

3. The herein-described record-blank for meters of the character described, the same consisting of a leaf having a printed representation on one face of the recording dials or indexes of the meter, and on its reverse face blanks for the date of record, number of meter, &c., substantially as and for the purpose specified.

In testimony that I claim the foregoing as my own I affix my signature in presence of two witnesses.

IRA S. SCHROP.

Witnesses:
JAMES DUSHANE,
WILL G. PROBILL.